(12) United States Patent
Burnett

(10) Patent No.: US 8,131,972 B2
(45) Date of Patent: Mar. 6, 2012

(54) METHOD AND APPARATUS FOR IMPROVING MEMORY COALESCING IN A VIRTUALIZED HARDWARE ENVIRONMENT

(75) Inventor: Rodney Carlton Burnett, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 633 days.

(21) Appl. No.: 11/857,554

(22) Filed: Sep. 19, 2007

(65) Prior Publication Data

US 2009/0077108 A1 Mar. 19, 2009

(51) Int. Cl.
*G06F 7/06* (2006.01)
*G06F 17/15* (2006.01)

(52) U.S. Cl. ........................ 711/203; 707/693

(58) Field of Classification Search .................. 707/100, 707/200, 822, 999.1, 693; 711/203
See application file for complete search history.

(56) References Cited

U.S. PATENT DOCUMENTS

| | | | | |
|---|---|---|---|---|
| 5,948,062 | A * | 9/1999 | Tzelnic et al. | 709/219 |
| 6,901,403 | B1 * | 5/2005 | Bata et al. | 707/101 |
| 7,146,373 | B2 | 12/2006 | Beier et al. | |
| 2003/0149858 | A1 * | 8/2003 | Wright et al. | 711/207 |
| 2005/0060316 | A1 * | 3/2005 | Kamath et al. | 707/9 |
| 2005/0131924 | A1 * | 6/2005 | Jones | 707/100 |
| 2005/0203950 | A1 * | 9/2005 | Rajan et al. | 707/103 R |
| 2006/0149806 | A1 * | 7/2006 | Scott et al. | 709/201 |
| 2006/0184719 | A1 * | 8/2006 | Sinclair | 711/103 |
| 2006/0230452 | A1 * | 10/2006 | Field | 726/22 |
| 2006/0265438 | A1 * | 11/2006 | Shankar et al. | 707/206 |
| 2007/0276823 | A1 * | 11/2007 | Borden et al. | 707/5 |
| 2008/0243769 | A1 * | 10/2008 | Arbour et al. | 707/2 |

OTHER PUBLICATIONS

"A method for faster searches of external file properties using negative caching of directory relationships", IBM Research Disclosure, n441, Jan. 2001, Article 165, pp. 170.

* cited by examiner

*Primary Examiner* — Jacob F Betit
*Assistant Examiner* — Sheryl Holland
(74) *Attorney, Agent, or Firm* — Yee & Associates, P.C.; David A. Mims, Jr.

(57) ABSTRACT

The illustrative embodiments described herein provide a computer implemented method, apparatus, and computer program product for managing memory in a shared environment. Upon receiving a file open event associated with a file, a tag value is generated based on the attributes of the file. Upon receiving a file read or write event associated with the file, a memory object is created to hold data associated with the file. The tag value is associated with the memory object. The tag value and the associated memory object are provided to a virtual hosting platform layer as hints to the underlying page coalescing mechanisms.

20 Claims, 6 Drawing Sheets

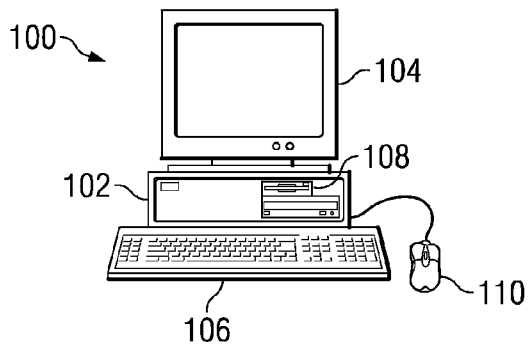
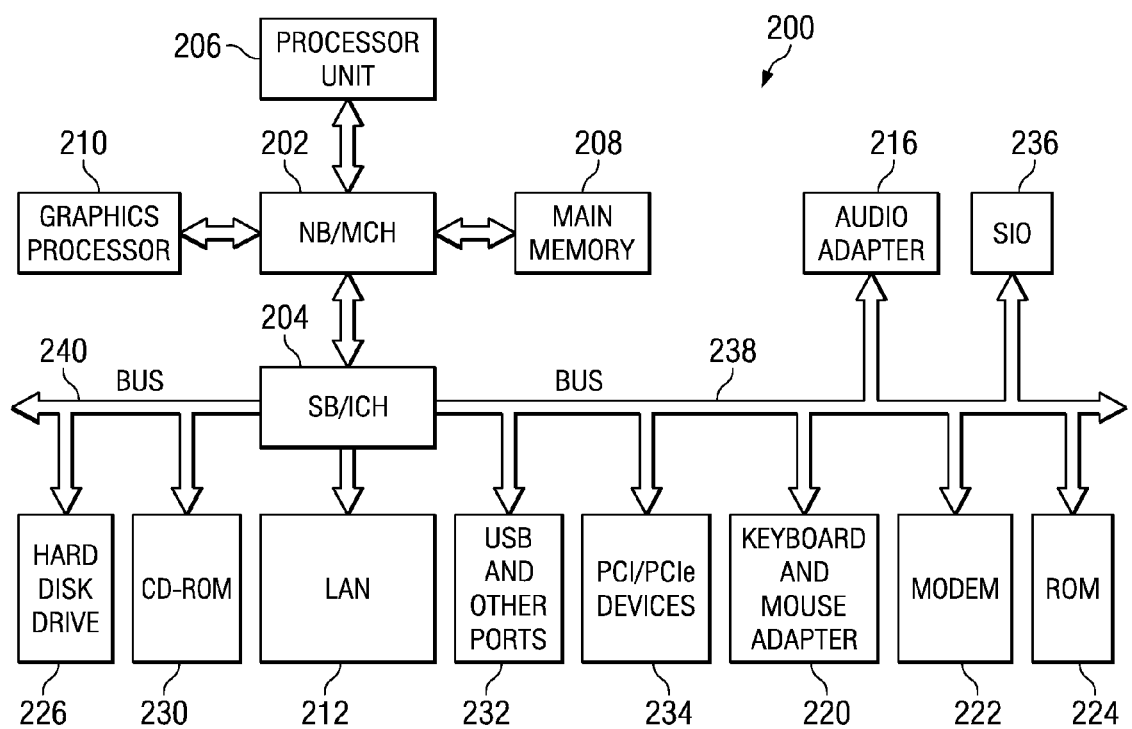

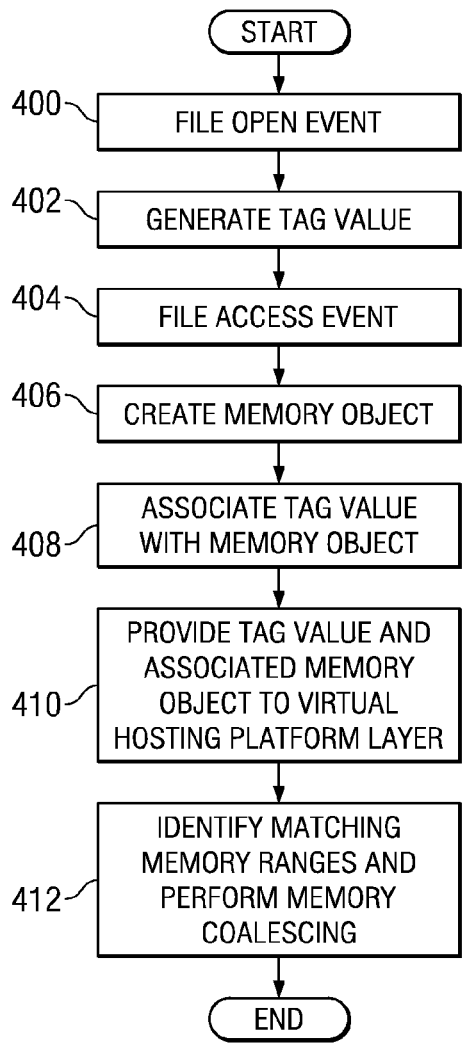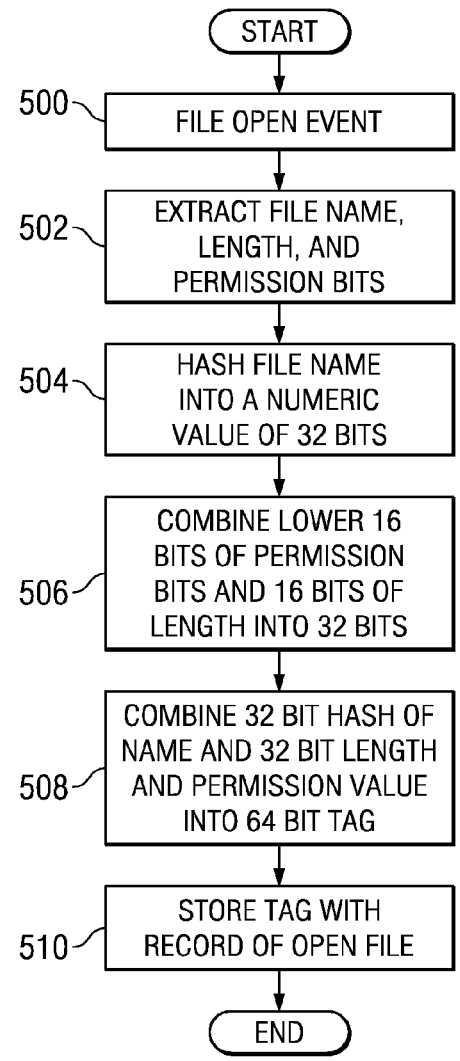

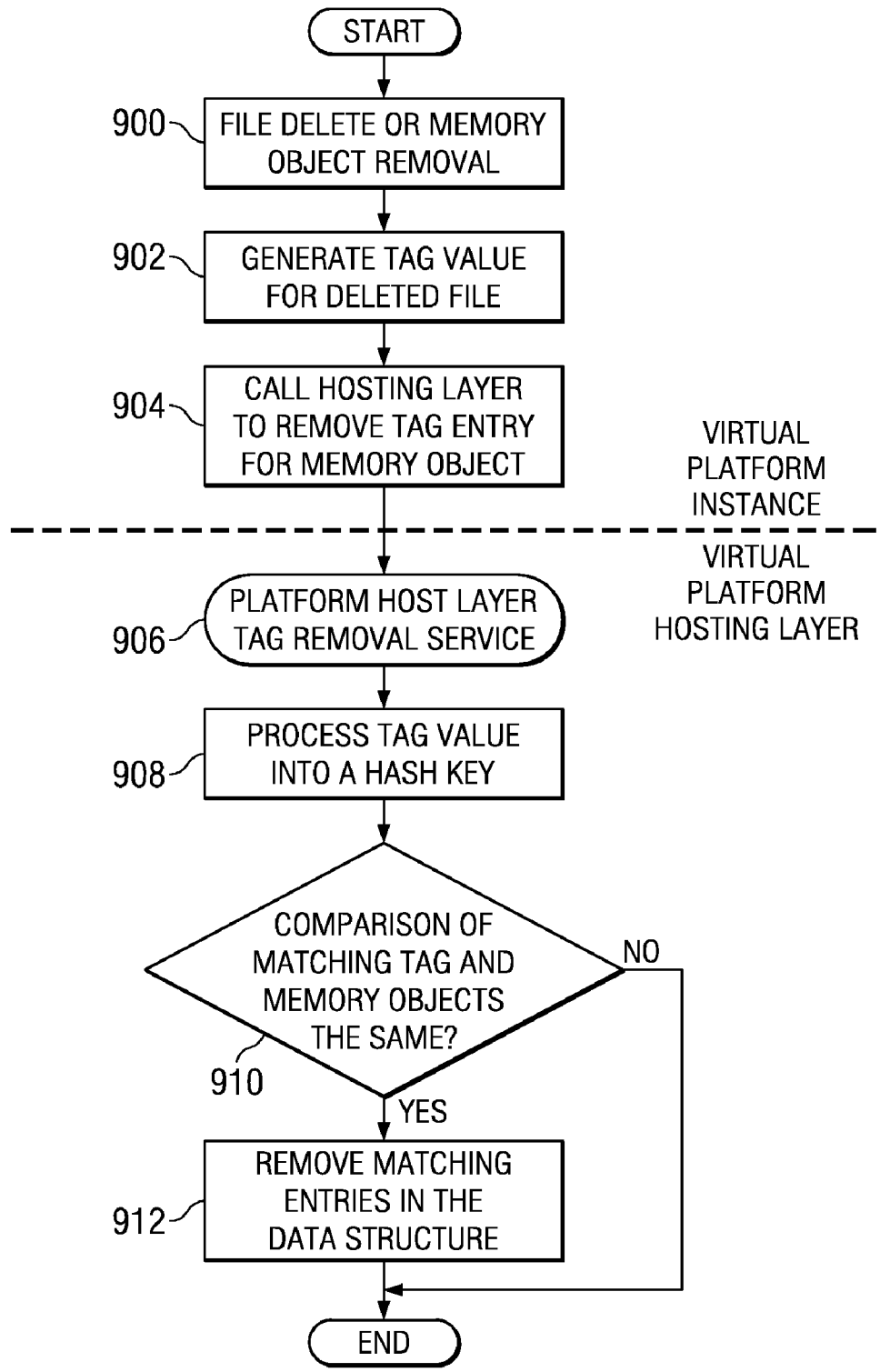

METHOD AND APPARATUS FOR IMPROVING MEMORY COALESCING IN A VIRTUALIZED HARDWARE ENVIRONMENT

BACKGROUND OF THE INVENTION

1. Field of the Invention

The present invention relates generally to a method and apparatus for managing memory in a shared environment. Still more particularly, the present invention relates to an apparatus and a computer implemented method for improving memory coalescing in a virtualized hardware environment.

2. Description of the Related Art

Platform virtualization involves the simulation of computer environments. The advantages associated with platform virtualization include increases in flexibility and opportunities to consolidate workloads from multiple computers onto fewer systems running multiple concurrent virtual machine environments. By consolidating workloads, the overall system utilization is improved and complexities associated with managing many independent physical systems are reduced.

While platform level virtualization provides high value, the required level of isolation and flexible allocation of resources, such as, the central processing unit (CPU) and memory to aid in the deployment of those resources is costly because each virtual platform is effectively an individual system with many of its resources dedicated and non-sharable. Memory, such as random access memory (RAM), and the data contained within the memory are examples of resources dedicated to each virtual platform.

Memory coalescing is a mechanism that identifies duplicate memory ranges and redirects the references to the duplicate memory ranges to a single shared copy. The shared instance would reduce the aggregate memory footprint and allow a system run at optimal levels with a reduced amount of total memory.

Currently, brute computational force can be applied in the underlying memory management layers of a virtual machine provider to find matching regions of memory that can be consolidated into a single shared memory range used by all virtual instances until a modification event happens. Applying the brute computational force approach does not require advanced integration and is easy to pursue with available shared knowledge in the operating system (OS) and virtualization platform memory management layers.

However, significant computational power is required to scan large amounts of memory with a high frequency of "misses" resulting. Because of the computational requirement, scans must occur as background activity consuming only a small perceived amount of system resources so as not to impact running workloads that deliver business value. With this approach, data must reside in memory long enough for the scans to find and consolidate duplicate ranges. As a result, only minor incremental value is achieved unless there are enough duplicate ranges that reside for long periods of time in the system. Transient data or rapid changes to the required memory footprint are not consolidated in time to minimize aggregate memory requirements on a system.

SUMMARY OF THE INVENTION

The illustrative embodiments described herein provide a computer implemented method, apparatus, and computer program product for improving memory coalescing in a virtualized hardware environment. Upon receiving a file open event associated with a file, a tag value is generated based on the attributes of the file. Upon receiving a file access event associated with the file, a memory object is created to hold data associated with the file. The tag value is associated with the memory object. The tag value and the associated memory object are provided to a virtual hosting platform layer as hints to the underlying page coalescing mechanisms. The virtual hosting platform layer uses the tag value to improve memory coalescing potential, reduce computational requirements, and capture shared resources in short lived memory images.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a representation of a data processing systems in which illustrative embodiments may be implemented;

FIG. 2 is a block diagram illustrating a data processing system in which illustrative embodiments may be implemented;

FIG. 4 is a flowchart illustrating a process for performing memory coalescing in a virtualized hardware environment in accordance with an illustrative embodiment;

FIG. 5 is a flowchart illustrating a process for generating a tag value in accordance with an illustrative embodiment;

FIG. 9 is a flowchart illustrating a process for removing a tag value from a searchable data structure in accordance with an illustrative embodiment.

DETAILED DESCRIPTION OF THE PREFERRED EMBODIMENT

Figure 3A:
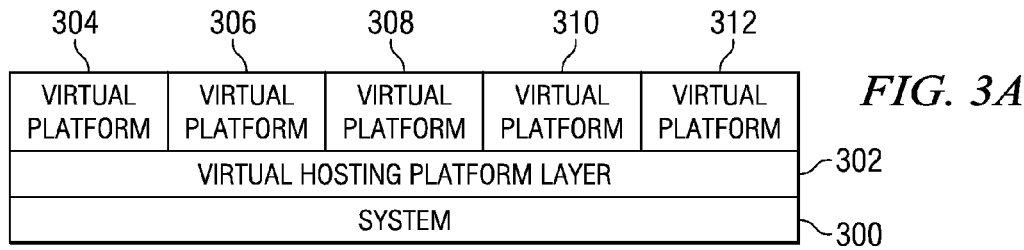
FIG. 3A is a block diagram illustrating a virtual platform environment in accordance with an illustrative embodiment.

With reference now to the figures, and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices could include, for example, a joystick, a touchpad, a touch screen, a trackball, and a microphone.

Computer 100 may be any suitable computer, such as an IBM® System p™ computer, which is a product of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including an interface and memory controller hub (interface/MCH) 202 and an interface and input/output (I/O) controller hub (interface/ICH) 204. Processing unit 206, main memory 208, and graphics processor 210 are coupled to interface and memory controller hub 202. Processing unit 206 may contain one or more processors and even may be implemented using one or more heterogeneous processor systems. Graphics processor 210 may be coupled to interface and memory controller hub 202 through an accelerated graphics port (AGP), for example.

In the depicted example, local area network (LAN) adapter 212 is coupled to interface and I/O controller hub 204, audio adapter 216, keyboard and mouse adapter 220, modem 222, read only memory (ROM) 224, universal serial bus (USB) and other ports 232. PCI/PCIe devices 234 are coupled to interface and I/O controller hub 204 through bus 238. Hard disk drive (HDD) 226 and CD-ROM 230 are coupled to interface and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to interface and I/O controller hub 204.

An operating system runs on processing unit 206. This operating system coordinates and controls various components within data processing system 200 in FIG. 2. The operating system may be a commercially available operating system, such as Microsoft® Windows Vista™. (Microsoft® and Windows Vista are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226. These instructions and may be loaded into main memory 208 for execution by processing unit 206. The processes of the illustrative embodiments may be performed by processing unit 206 using computer implemented instructions, which may be located in a memory. An example of a memory is main memory 208, read only memory 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative examples shown. For example, a bus system may be comprised of one or more buses, such as a system bus, an I/O bus, and a PCI bus. Of course, the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in interface and memory controller hub 202. In addition, a processing unit may include one or more processors or CPUs.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

FIG. 3A is a block diagram illustrating a virtual platform environment in accordance with an illustrative embodiment. System 300 may be implemented in a data processing system, such as data processing system 100 shown in FIG. 1 or data processing system 200 shown in FIG. 2.

Virtual hosting platform layer 302 runs on system 300 and performs the system wide memory management of system 300. In this example, virtual platforms 304-312 all run concurrently on system 300. Virtual platforms 304-312 each run separate instances of their own operating system. The operating systems may be the same kind of operating system, such as, without limitation, Microsoft® Windows Vista™. Additionally, virtual platforms 304-312 may run different operating systems, such as, but not limited to, virtual platform 304 running the Unix™ operating system and virtual platforms 306-312 running Microsoft® Windows Vista™.

Using Virtual hosting platform layer 302, each of virtual platforms 304-312 effectively operate as an individual system with many of its resources dedicated and non-sharable. Memory, such as random access memory, and the data contained within the memory are examples. This improves the overall system utilization and helps reduce complexities associated with managing many independent physical systems.

A disadvantage of sharing resources between virtual platforms is that the appropriate memory must be assigned to support the peak load on each virtual platform. For workloads with large memory footprints, massive amounts of system must be purchased to accommodate the peak aggregate load of the virtual platforms with optimal performance. Often, these workloads are comprised of common or duplicated resources such as, without limitation, operating system images, middleware and application software, and application data that could potentially be shared in memory by all the virtual platforms. Therefore, the illustrative embodiments recognize that a mechanism is needed that could improve identifying duplicate memory ranges and coalescing it into a single shared copy.

Therefore, the illustrative embodiments provide a computer implemented method, apparatus, and computer program product for improving memory coalescing in a virtualized hardware environment. Upon receiving a file open event associated with a file, a tag value is generated based on the attributes of the file. The tag value is a value generated based on the attributes of the file. Any algorithm may be used so long as the algorithm produces a wide dispersion of repeatable outputs with modest uniqueness for each potential set of file attributes.

Upon receiving a file access event associated with the file, a memory object is created to hold data associated with the file. A file access event may be a read or write event associated with the file data in memory. A memory object is a range of memory allocated to hold data associated with a file. The tag value is associated with the memory object. The tag value and the associated memory object are provided to a virtual hosting platform layer as a hint to the underlying page coalescing mechanisms. The virtual hosting platform layer uses the tag value to efficiently identify matching memory ranges for performing memory coalescing.

Figure 3B:
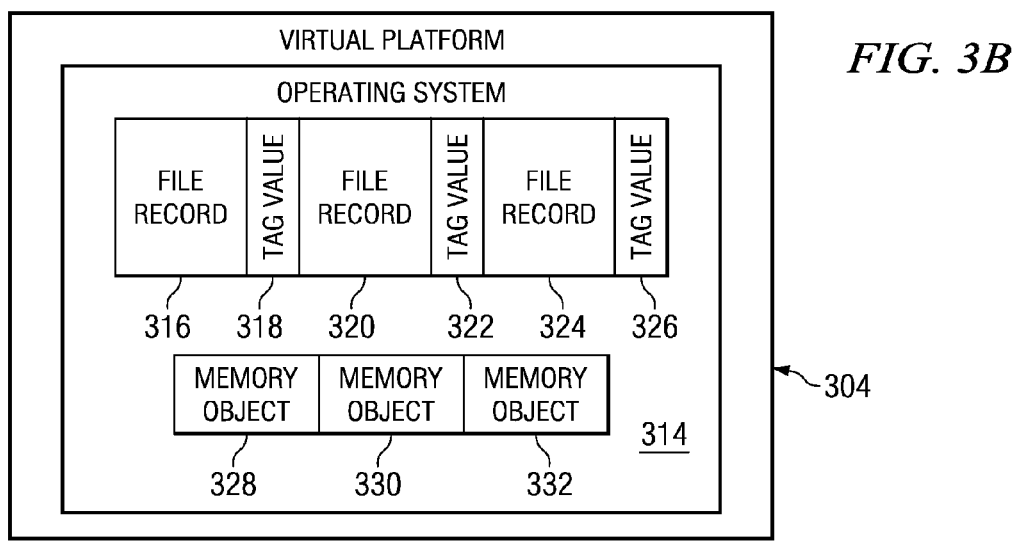
FIG. 3B is a block diagram illustrating a virtual platform in accordance with an illustrative embodiment.

With reference to FIG. 3B, a block diagram illustrating a virtual platform in accordance with an illustrative embodiment is depicted. The virtual platform in FIG. 3B may be implemented in any of the virtual platforms in FIG. 3A, such as virtual platform 304 in FIG. 3A.

Operating system 314 runs on virtual platform 304. Upon generating a file open event associated with a file, operating system 314 generates a tag value, such as tag values 318, 322, and 326. Operating system 314 stores the tag value associated with the file in the file record, such as file records 316, 320, and 324. For example, tag value 318 generated upon a file open event of a file will be stored in a file record, such as file record 316.

Additionally, upon receiving a file access event associated with a file, operating system 314 creates a memory object to hold data associated with the file, such as memory objects 328, 330, and 332. Operating system 314 then associates the memory object with the tag value. For example, tag value 318 generated from an open file event of the file stored in file record 316 is associated with memory object 328 created when a file access event occurred on the file stored in file record 316. The tag value and the associated memory object are then provided to the virtual hosting platform layer as a hint to the underlying data stored in memory.

Figure 3C:
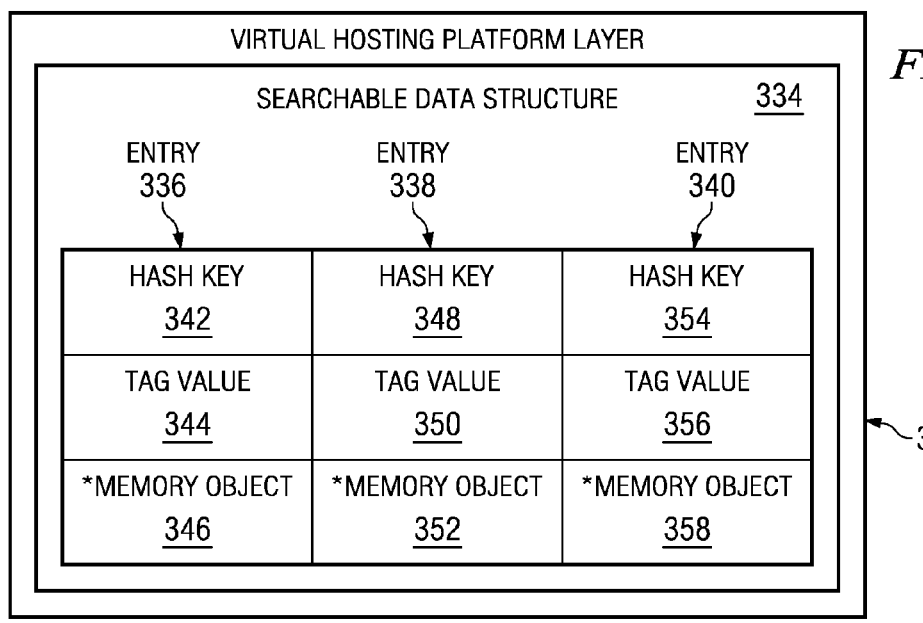
FIG. 3C is a block diagram illustrating a virtual hosting platform layer in accordance with an illustrative embodiment.

FIG. 3C is a block diagram illustrating a virtual hosting platform layer in accordance with an illustrative embodiment. The virtual hosting platform layer in FIG. 3C may be implemented in any virtual hosting platform layer, such as virtual hosting platform layer 302 in FIG. 3A.

Virtual hosting platform layer 302 contains a searchable data structure, such as searchable data structure 334, to store the tag value and the associated memory object. The tag value and the associated memory object are provided by an operating system running on a virtual platform, such as operating system 314 running on virtual platform 304 in FIG. 3B. The tag value and the associated memory object are entered into searchable data structure 334. Searchable data structure 334 may be any type of data structure, such as, but without limitation, an array or a linked list. Searchable data structure 334, as illustrated, contains entry 336, entry 338, and entry 340. However, searchable data structure 334 may contain any number of entries.

Each entry contains a hash key, a tag value, and reference to the associated memory object. For example, entry 336 contains hash key 342, tag value 344, and reference to the associated memory object 346. Similarly, entry 338 contains hash key 348, tag value 350, and reference to the associated memory object 352, and entry 340 contains hash key 354, tag value 356, and reference to the associated memory object 358.

A hash key, such as hash key 342, is a value generated using the tag value. Any algorithm may be used to generate the hash key so long as the algorithm produces a repeatable key value for a given tag value and generates a reasonably even distribution of hash values across the allowed range of hash values. The hash key is used for inserting the tag value and the reference to the associated memory object into searchable data structure 334. The hash key is usually shorter than the tag value and is used to index and retrieve entries in searchable data structure 334 because it is faster to find the entry using the shorter hashed key than to find it using the original tag value.

By quickly storing and retrieving this hint identifier, virtual hosting platform layer 302 improves memory coalescing potential because the data contained in different memory ranges are more likely to be the same if they have matching tag values. Therefore, the computational requirements needed to find matching memory regions are reduced. In addition, short-lived memory images can be captured due to the increase in efficiency of finding matching memory regions using the tag values as a hint to the underlying data in memory.

With reference to FIG. 4, a flowchart illustrating a process for performing memory coalescing in a virtualized hardware environment in accordance with an illustrative embodiment is depicted. The process in FIG. 4 is implemented by a system, such as system 300 in FIG. 3A.

The process begins when an operating system running on a virtual platform, such as operating system 314 running on virtual platform 304 in FIG. 3B, generates a file open event (step 400). Responsive to the file open event, a tag value is generated (step 402). Responsive to receiving a file access event (step 404), a memory object is created to hold data associated with the file (step 406). The tag value is associated with the memory object (step 408). The tag value and the associated memory object are provided to a virtual hosting platform layer as a hint to the underlying page coalescing mechanisms (step 410). The virtual hosting platform layer uses the tag value to efficiently identify matching memory ranges for performing memory coalescing (step 412), with the process terminating thereafter.

With reference to FIG. 5, a flowchart illustrating a process for generating a tag value in accordance with an illustrative embodiment is depicted. The process in FIG. 5 is implemented by an operating system running on a virtual platform, such as operating system 314 running on virtual platform 304 in FIG. 3B. The illustrated process includes producing an integer value of 32 or 64 bits derived from a combination of the characters in the file name, file size, and the file's attached permissions.

The process begins when an operating system generates a file open event (step 500). Upon generating the file open event, the file name, length, and permissions bits are extracted from the file (step 502). The file name is then hashed into a numeric value of 32 bits (step 504). The lower 16 bits of the permission bits are combined with the 16 bits of the length to form a 32-bit numeric value (step 506). The 32-bit numeric value of the file name is then combined with the 32 bits of the permission and length value to form a 64-bit tag value (step 508). The tag value is then stored with the record of the opened file (step 510), with the process terminating thereafter.

Figure 6:
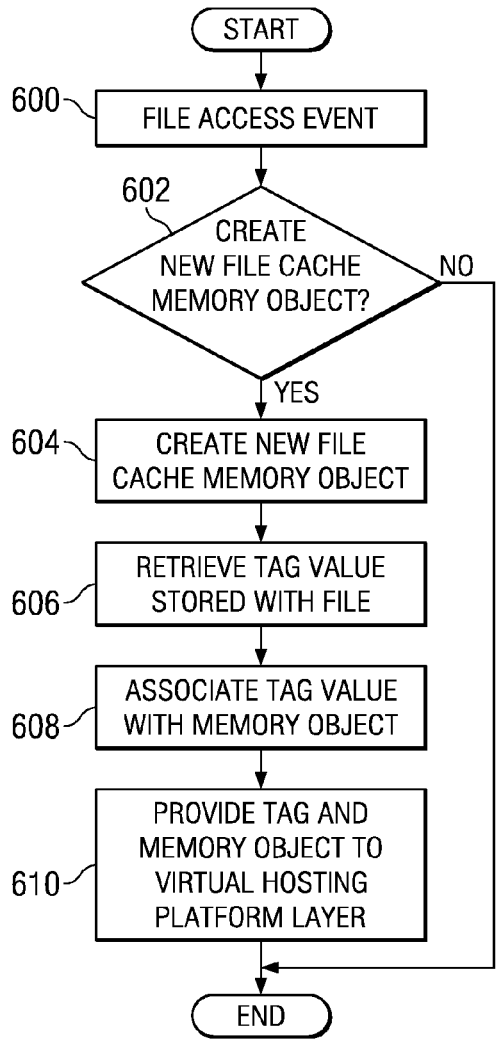
FIG. 6 is a flowchart illustrating a process for associating a tag value with a memory object in accordance with an illustrative embodiment.

FIG. 6 is a flowchart illustrating a process of associating a tag value with a memory object in accordance with an illustrative embodiment. The process in FIG. 6 is implemented by an operating system running on a virtual platform, such as operating system 314 running on virtual platform 304 in FIG. 3B.

The process begins when an operating system generates a file access event, such as a read or write event, to a file (step 600). A determination is made as to whether a new file cache memory object should be created for the file (step 602). If a file cache memory object currently exists for the file, the process ends.

If a file cache memory object does not currently exist for the file, a new file cache memory object is created for the file (step 604). The tag value is then retrieved from the record of the opened file (step 606). The tag value is associated with the new file cache memory object (step 608). The tag value and the associated memory object are provided to a virtual hosting platform layer (step 610), such as, without limitation, virtual hosting platform layer 302 in FIG. 3A, with the process terminating thereafter.

Figure 7:
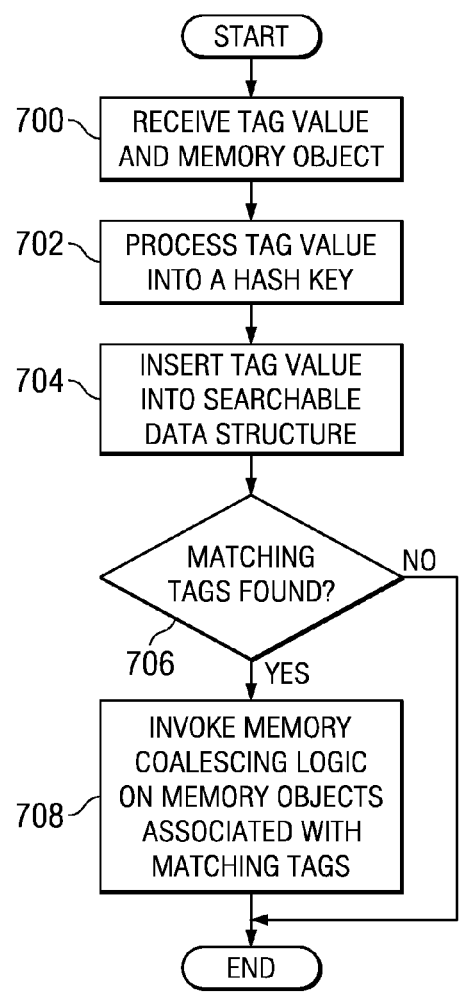
FIG. 7 is a flowchart illustrating a process for adding a tag value into a searchable data structure in accordance with an illustrative embodiment.

With reference to FIG. 7, a flowchart illustrating a process for adding a tag value into a searchable data structure in accordance with an illustrative embodiment is depicted. The process in FIG. 7 may be implemented by a virtual hosting platform layer, such as virtual hosting platform layer 302 in FIG. 3A.

The process begins when the virtual hosting platform layer receives the tag value and the associated memory object from an operating system running on a virtual platform, such as operating system 314 running on virtual platform 304 in FIG. 3B (step 700). The virtual hosting platform layer processes the tag value into a hash key for insertion into a searchable data structure (step 702). Examples of searchable data structures that may be used in accordance with illustrative embodiments, includes, for example, arrays, linked-lists, and hash tables. The tag value is then inserted into the searchable data structure (step 704). The tag value entry contains references to the associated memory object.

The inserted tag value is compared with the set of tag values previously inserted in the searchable data structure to determine if there is a pre-existing matching tag value (step 706). If a pre-existing matching tag value is not present, the process ends. If a pre-existing tag value(s) matching the inserted tag value is present at step 706, the virtual hosting platform layer invokes the memory coalescing logic on the associated memory objects of the matching tag values (step 708) with the process terminating thereafter.

Figure 8:
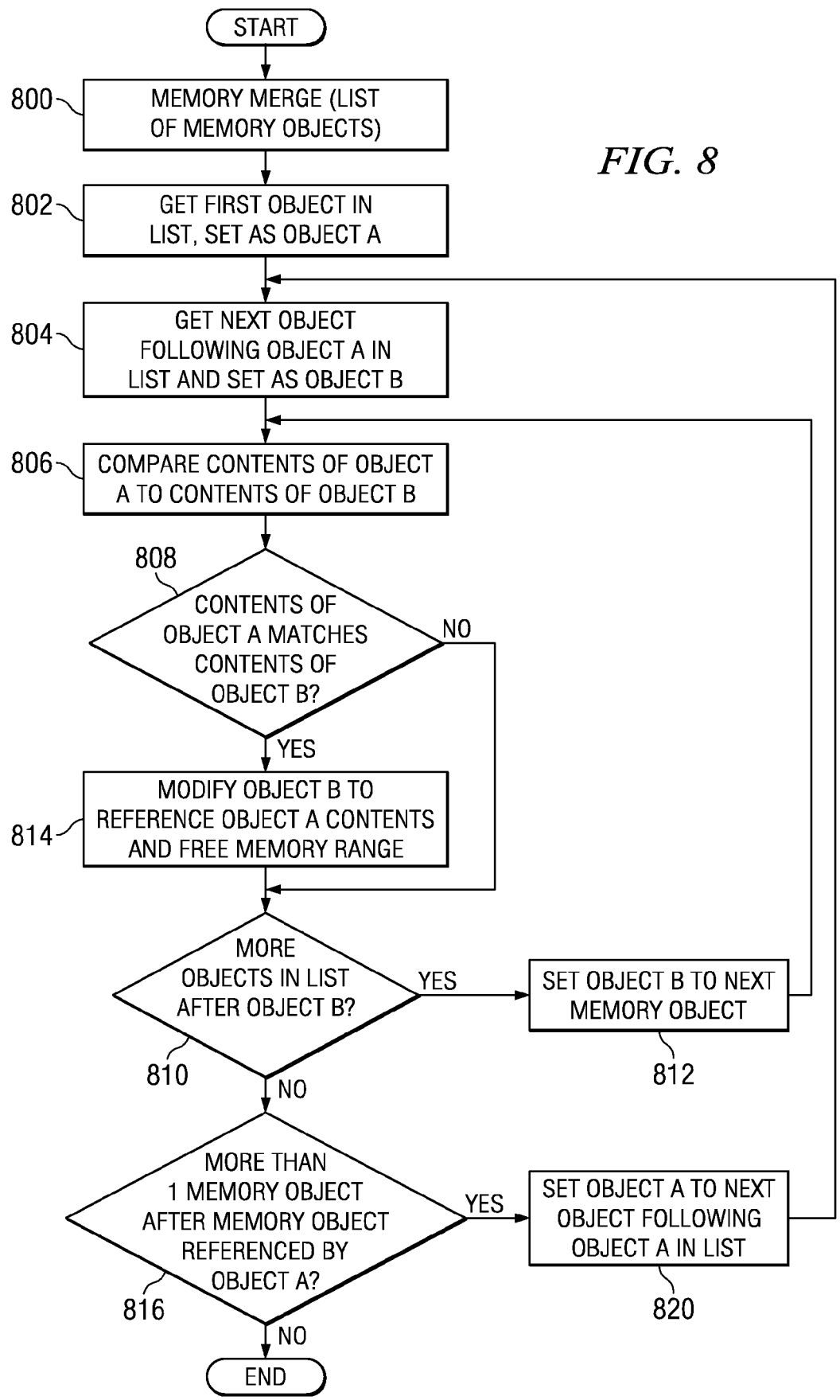
FIG. 8 is a flowchart illustrating a process for memory coalescing in accordance with an illustrative embodiment.

FIG. 8 illustrates a process of memory coalescing in accordance with an illustrative embodiment. The process in FIG. 8 is implemented by a virtual hosting platform layer, such as virtual hosting platform layer 302 in FIG. 3A. The process of FIG. 8 compares every memory object in the list of memory objects with each other to determine if there are any matching memory objects.

FIG. 8 begins by performing a memory merge call with a list of memory objects associated with matching tag values as input parameters (step 800). The first memory object in the list of memory objects is retrieved and a variable, such as object A, is set to the first memory object (step 802). The subsequent memory following the memory object referenced by object A in the list of memory objects is retrieved and a variable, such as object B, is set to the subsequent memory object (step 804). The contents of object A is then compared to the contents of object B (step 806).

A determination is made as to whether the contents of object A matches the contents of object B (step 808). If the contents of object A matches the contents of object B, the reference to contents of object B will be modified to reference the contents of Object A and the memory range referenced by object B will be freed (step 814). The process then determines whether there are more memory objects in the list of memory objects after object B (step 810). If at step 808 the contents of object A does not match the contents of object B, the process will proceed to step 810. If more memory objects exist in the list of memory objects after object B, object B is set to the next subsequent memory object (step 812) and the process repeats at step 806. If additional objects are absent in the list of memory objects after the memory object referenced by object B, then the process determines whether more than one object exists in the list of memory objects after the memory object referenced by object A (step 816).

If more than one object after the memory object referenced by object A does not exist, then the process terminates. If more than one object after the memory object referenced by object A does exist, object A is set to the subsequent memory object in the list of memory objects immediately following the memory object currently referenced by object A (step 820). The process then iteratively executes steps 804 to 820 until the process terminates.

With reference to FIG. 9, flowchart illustrating a process for removing a tag value from a searchable data structure in accordance with an illustrative embodiment is depicted. The process begins when an operating system running on a virtual platform, such as operating system 314 running on virtual platform 304 in FIG. 3B, deletes a file (step 900). The operating system generates a tag value for the deleted file, as shown in FIG. 4 (step 902). The virtual platform calls the virtual hosting platform layer to remove the tag and the associated memory object of the deleted file (step 904).

The virtual hosting platform layer receives the tag value and the associated memory object and invokes the tag removal service (step 906). The virtual hosting platform layer processes the tag value into a hash key for insertion into the searchable data structure (step 908). A determination is made as to whether the contents of the memory objects associated with all matching tag values is the same (step 910). If the contents of the memory objects associated with the matching tag values are the same, the matching tag value entry is removed from the searchable data structure (step 912) with the process terminating thereafter. If there are no matching tag values and associated memory objects in step 910, the process terminates.

The illustrative embodiments described herein provide a computer implemented method, apparatus, and computer program product for improving memory coalescing in a virtualized hardware environment. Upon receiving a file open event associated with a file, a tag value is generated based on the attributes of the file. Upon receiving a file access event associated with the file, a memory object is created to hold data associated with the file. The tag value is associated with the memory object. The tag value and the associated memory object are provided to a virtual hosting platform layer.

The virtual hosting platform layer performs the function of memory coalescing. The virtual hosting platform layer uses the tag value to improve coalescing potential, reduce computational requirements, and capture shared resources in short lived memory images.

The process significantly increases the degree of memory coalescing using per file object attributes that are provided as hints to underlying page coalescing mechanisms. Because files are the primary source of data in memory, location independent attributes of the file can be used to drastically improve the efficiency of a memory coalescing machine. For example, files with the same name and length have a higher probability of exact data contents. Additional attributes, such as security permissions, provide further evidence of matching content. These properties alone greatly increase the chance that comparing the resulting memory data of two objects in different virtual instances will yield a match. Therefore, the frequency of failed consolidation attempts is reduced.

This memory identifier hint is provided for a memory range to the underlying search and compare engine of the virtual hosting platform. The memory range may be organized as a memory page number, a range of pages, a range of bytes, or a container enveloping a large collection of memory pages.

The advantage of this method is that it allows very fine-grained partitioning of the memory search space, resulting in a significantly improved chance of matching memory ranges that can be consolidated into a single shared instance. The mechanism is agnostic to the class or use of memory and it provides equal opportunity to coalesce memory associated with binary images and application data.

Furthermore, because the provided memory hints are based on names or other location independent qualities, the search is not hampered by physical device dependencies such as which storage device or a location on a storage device. This general quality further permits matching of memory associated with source data objects that might reside on a remote system, such as a networked attached storage device.

While a majority of memory data comes from files, significant amounts of application-generated data can also occur in memory. It is desirable to capture consolidation opportunities here as well. There exists an increased probability of common memory ranges in application-produced data if it is generated by the same application. Therefore, the above method can be used to apply the owning application's tag, with perhaps minor modification in the generated numeric value, to the memory regions of the generated data. Analyzing these matching tagged areas as a lower priority activity may yield additional consolidation.

The flowchart and block diagrams in the figures illustrate the architecture, functionality, and operation of possible implementations of systems, methods and computer program products according to various embodiments. In this regard, each step in the flowchart or block diagrams may represent a module, segment, or portion of code, which comprises one or more executable instructions for implementing the specified logical function(s). It should also be noted that, in some alternative implementations, the functions noted in the step may occur out of the order noted in the figures. For example, two steps shown in succession may, in fact, be executed substantially concurrently, or the steps may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for performing memory coalescing in a virtualized hardware environment, the computer implemented method comprising:
responsive to a file open event associated with a file, generating a tag value using attributes of the file;
responsive to a file access event of the file, creating a memory object to hold data associated with the file;
associating the tag value with the memory object; and
providing the tag value and the associated memory object to a virtual hosting platform layer, wherein the tag value is used by the virtual hosting platform layer to identify matching memory ranges for performing memory coalescing that identifies duplicate memory ranges and redirects references to the duplicate memory ranges to a single shared copy.

2. The computer implemented method of claim 1, further comprising:
   responsive to generating the tag value using attributes of the file, storing the tag value with a record of the file; and
   responsive to creating the memory object to hold the data associated with the file, retrieving the tag value from the record.

3. The computer implemented method of claim 1, wherein the tag value is a first tag value and the memory object is a first memory object, further comprising:
   inserting the first tag value into a searchable data structure;
   comparing the first tag value to a second tag value contained in the searchable data structure; and
   responsive to the first tag value matching the second tag value, performing memory coalescing of the first memory object and a second memory object associated with the second tag value.

4. The computer implemented method of claim 1, wherein the attributes of the file are location independent attributes.

5. The computer implemented method of claim 3, wherein the step of performing memory coalescing further comprises:
   comparing a first set of data contained in the first memory object to a second set of data contained in the second memory object;
   responsive to the first set of data matching the second set of data, associating the second tag value with the first memory object; and
   freeing a range of memory associated with the second memory object.

6. The computer implemented method of claim 3, further comprising:
   responsive to a file removal event, comparing the tag value to a set of existing tag values contained in the searchable data structure;
   responsive to the tag value matching an existing tag value in the set of existing tag values, comparing data contents of memory objects associated with the matching tag values; and
   responsive to matching the data contents of the memory objects associated with the matching tag values, removing the existing tag value from the searchable data structure.

7. The computer implemented method of claim 3, wherein the step of inserting the tag value into a searchable data structure further comprises:
   hashing the tag value to generate a hash key.

8. The computer implemented method of claim 4, wherein the location independent attributes further comprises:
   a file name, a file length, and file permissions.

9. A computer program product comprising:
   a computer usable storage medium including computer usable program code stored on the computer usable storage medium for improving memory coalescing in a virtualized hardware environment, said computer program product comprising:
   computer usable program code for generating a tag value using attributes of a file in response to a file open event associated with the file;
   computer usable program code for creating a memory object to hold data associated with the file in response to a file access event of the file;
   computer usable program code for associating the tag value with the memory object; and
   computer usable program code for providing the tag value and the associated memory object to a virtual hosting platform layer, wherein the tag value is used by the virtual hosting platform layer to identify matching memory ranges for performing memory coalescing that identifies duplicate memory ranges and redirects references to the duplicate memory ranges to a single shared copy.

10. The computer program product of claim 9, further comprising:
   computer usable program code for storing the tag value with a record of the file in response to generating the tag value using attributes of the file; and
   computer usable program code for retrieving the tag value from the record in response to creating the memory object to hold the data associated with the file.

11. The computer program product of claim 9, wherein the tag value is a first tag value and the memory object is a first memory object, further comprising:
   computer usable program code for inserting the first tag value into a searchable data structure;
   computer usable program code for comparing the first tag value to a second tag value contained in the searchable data structure; and
   computer usable program code for performing memory coalescing of the first memory object and a second memory object associated with the second tag value in response to the first tag value matching the second tag value.

12. The computer program product of claim 9, wherein the attributes of the file are location independent attributes.

13. The computer program product of claim 11, wherein the computer usable program code for performing memory coalescing further comprises:
   computer usable program code for comparing a first set of data contained in the first memory object to a second set of data contained in the second memory object;
   computer usable program code for associating the second tag value with the first memory object in response to the first set of data matching the second set of data; and
   computer usable program code for freeing a range of memory associated with the second memory object.

14. The computer program product of claim 11, further comprising:
   computer usable program code for comparing the tag value to a set of existing tag values contained in the searchable data structure in response to a file removal event;
   computer usable program code for comparing data contents of memory objects associated with the matching tag values in response to the tag value matching an existing tag value in the set of existing tag values; and
   computer usable program code for removing the existing tag value from the searchable data structure in response to matching the data contents of the memory objects associated with the matching tag values.

15. The computer program product of claim 11, wherein the computer usable program code for inserting the tag value into a searchable data structure further comprises:
   computer usable program code for hashing the tag value to generate a hash key.

16. The computer program product of claim 12, wherein the location independent attributes further comprises:
   a file name, a file length, and file permissions.

17. An apparatus comprising:
   a bus system;
   a communications system connected to the bus system;
   a memory connected to the bus system, wherein the memory includes computer usable program code; and
   a processing unit connected to the bus system, wherein the processing unit executes the computer usable program code to generate a tag value using attributes of a file in response to a file open event associated with the file; create a memory object to hold data associated with the file in response to a file access event of the file; associate the tag value with the memory object;

and provide the tag value and the associated memory object to a virtual hosting platform layer, wherein the tag value is used by the virtual hosting platform layer to identify matching memory ranges for performing memory coalescing that identifies duplicate memory ranges and redirects references to the duplicate memory ranges to a single shared copy.

18. The apparatus of claim 17, further comprising:
computer usable program code to insert the tag value into a searchable data structure; compare the tag value to a second tag value contained in the searchable data structure; and perform memory coalescing of the memory object and a second memory object associated with the second tag value in response to the tag value matching the second tag value, wherein the memory object is associated with the tag value.

19. The apparatus of claim 17, wherein the attributes of the file are location independent attributes.

20. The apparatus of claim 19, wherein the location independent attributes further comprises, a file name, a file length, and file permissions.

* * * * *